(12) United States Patent
Miceli et al.

(10) Patent No.: US 6,439,718 B1
(45) Date of Patent: Aug. 27, 2002

(54) ADJUSTABLE NOSE PIECE ASSEMBLY FOR MAKE-UP EYEGLASSES

(75) Inventors: Sylvana Miceli, West Orange, NJ (US); Jack Lander, Danbury, CT (US)

(73) Assignee: Makoptica Patentees, LLC, West Orange, NJ (US)

( * ) Notice: Subject to any disclaimer, the term of this patent is extended or adjusted under 35 U.S.C. 154(b) by 0 days.

(21) Appl. No.: 09/772,170

(22) Filed: Jan. 29, 2001

(51) Int. Cl.[7] .................................................. G02C 5/04
(52) U.S. Cl. ........................................ 351/128; 351/137
(58) Field of Search ............................... 351/136, 137, 351/138, 124, 128, 41, 59, 55

(56) References Cited

U.S. PATENT DOCUMENTS 5,159,359 A * 10/1992 Pauly et al. ................. 351/128
5,971,538 A * 10/1999 Heffner ....................... 351/137
6,010,215 A *  1/2000 Miceli ......................... 351/128

* cited by examiner

Primary Examiner—Huy Mai
(74) Attorney, Agent, or Firm—Francis C. Hand; Carella, Byrne, Bain et al.

(57) ABSTRACT

The make-up eyeglass frame is provided with an adjustable nose piece assembly for adjusting the eyeglasses to the nose and face of a wearer. The nose piece assembly is readily removable from a bracket secured between two lens receiving sections for replacement purposes or for storing in a flattened condition. A pair of temples are hingedly mounted to the lens receiving sections to be folded into a flattened condition.

23 Claims, 3 Drawing Sheets

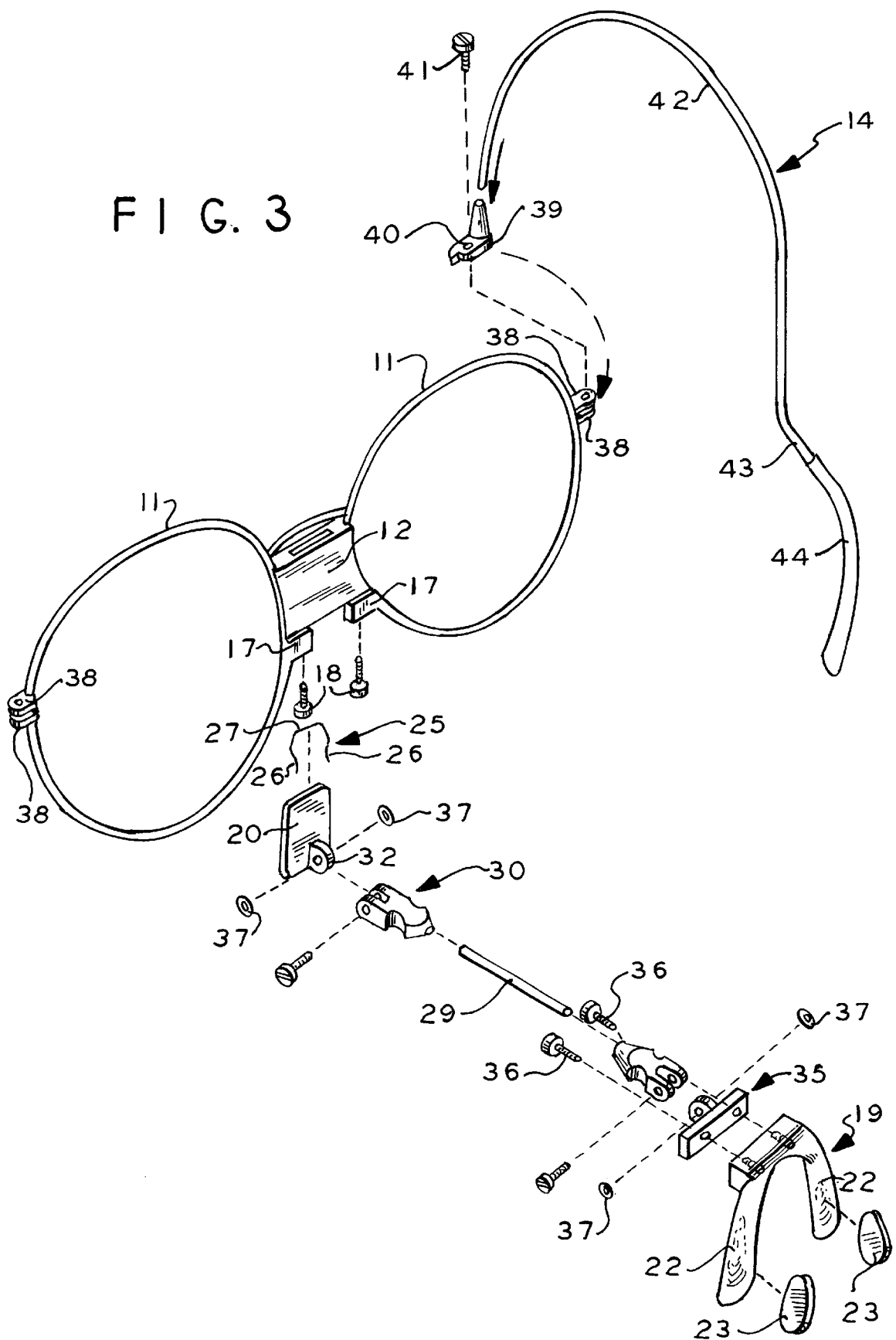

ADJUSTABLE NOSE PIECE ASSEMBLY FOR MAKE-UP EYEGLASSES

This invention relates to an eyeglass frame. More particularly, this invention relates to a nose piece assembly for an eyeglass frame.

U.S. Pat. No. 6,010,215 describes eyeglasses which are constructed to permit vision impaired persons to apply cosmetics to the eye region of the wearer's face while simultaneously enhancing vision. The present invention is directed to improvements of such eyeglass constructions in order to facilitate the use of the eyeglasses.

Briefly, the invention is directed to an eyeglass frame having a pair of lens receiving sections in which a bracket is secured between the lens receiving sections and a nose piece assembly is slidably mounted on the bracket for movement longitudinally thereof, for example up and down, to adjust to the shape and size of a wearer's nose and face.

The bracket is formed with a vertically disposed recess while the nose piece assembly includes a slide which is slidably mounted in the recess. In addition, a spring is disposed between the slide and the bracket within the recess for slidably engaging the slide and abutting the bracket in order to hold the slide in the recess of the bracket.

The nose piece assembly also includes a bridge at one end for disposition on a nose of a user and means connected to and between the slide and the bridge for adjusting the bridge relative to the slide and bracket. In one embodiment, the means is pivotally connected to the slide to pivot the bridge vertically of the bracket. In addition, this means is pivotally connected to the bridge to allow for adjustments thereat.

Alternatively, in another embodiment, the means for adjusting the bridge relative to the slide may be longitudinally adjustable to lengthen or shorten the nose piece assembly to adjust to the size of the wearer's nose and face.

In addition, the eyeglass frame has a pair of temples, each of which is pivotally mounted on a respective lens receiving section. In order to facilitate folding of the temples over each other onto the lens receiving sections, each lens receiving section is provided with a pair of outstanding ears and a pivot is fixedly secured to each temple for disposition between the ears. Any suitable means, such as a screw, pin, rivet or the like, is used to hingedly secure the pivot to the ears so that the temples may be folded flat against the lens receiving sections, for purposes of storage or ease of transportation.

The nose piece assembly is constructed as a self-contained unit composed of the slide, bridge and means connected to and between the slide and bridge for adjusting the bridge and slide relative to each other. For example, should an eyeglass frame require a different nose piece assembly, the existing nose piece assembly may be readily removed from the bracket between the two lens receiving sections and replaced by a new nose piece assembly.

These and other objects and advantages of the invention will become more apparent from the following detailed description taken in conjunction with the accompanying drawings wherein:

FIG. 3 illustrates an exploded view of the eyeglass frame of FIG. 1;

Figure 1:
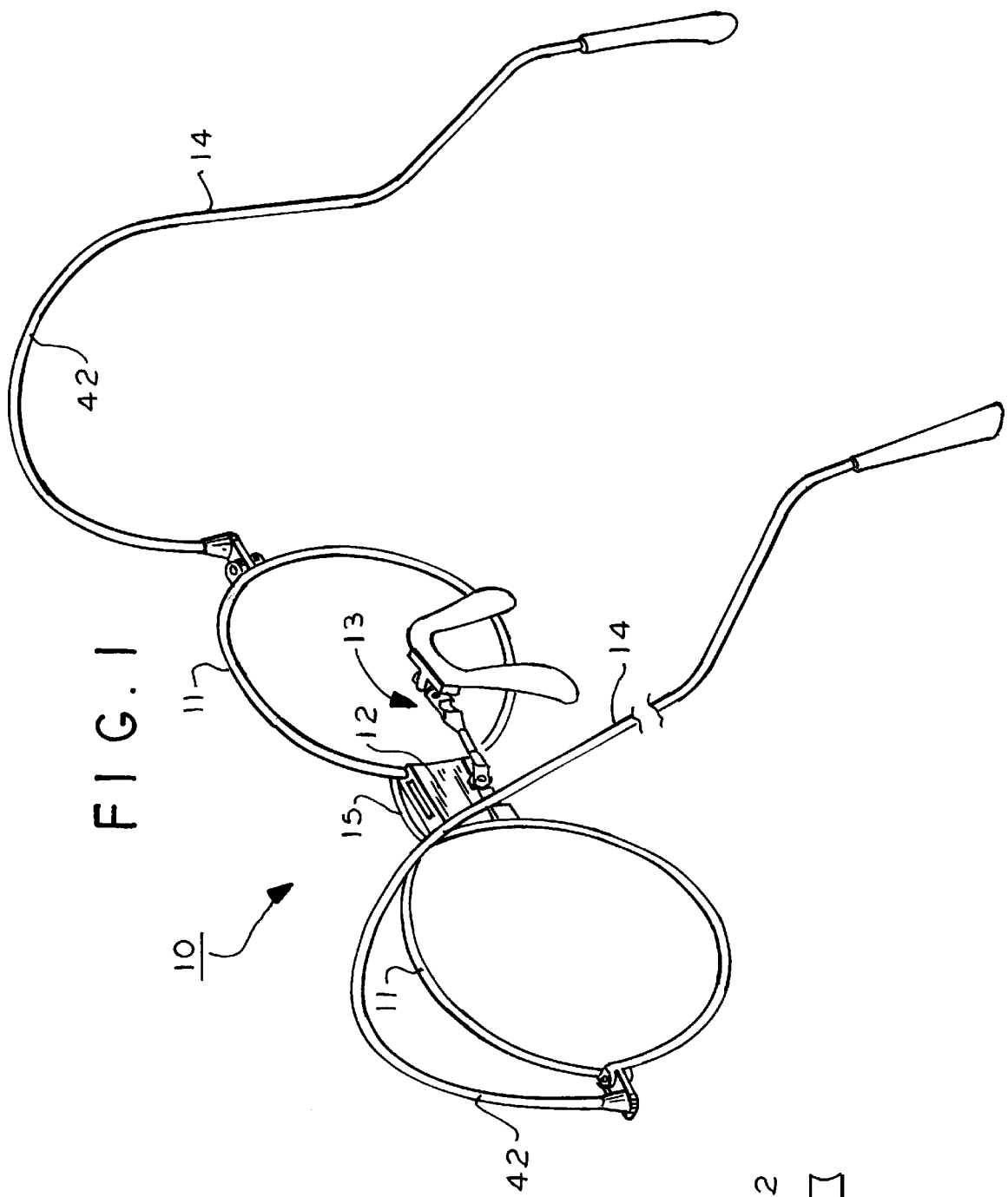
FIG. 1 illustrates a perspective view of an eyeglass frame constructed in accordance with the invention.

Referring to FIG. 1, the eyeglass frame 10 is constructed of a pair of lens receiving sections 11, a bracket 12 secured to and between the lens receiving sections 11, a nose piece assembly 13 and a pair of temples 14, each of which is pivotally mounted on a respective lens receiving section 11.

The lens receiving sections 11 are of conventional shape in order to receive a pair of lenses in any conventional manner. Typically, the lens receiving sections 11 are made of conventional materials, such as metals and plastics.

An integral connecting member 15 may also be disposed across and between the lens receiving sections 11.

Figure 4:
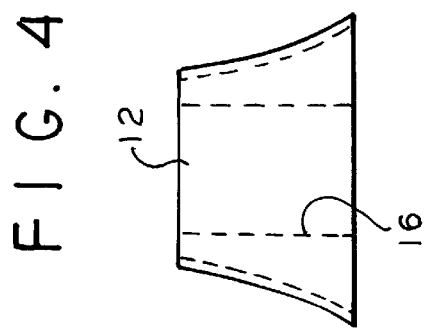
FIG. 4 illustrates a front view of the bracket secured between the lens receiving sections of FIG. 1.

Referring to FIG. 1, the bracket 12 is secured to and between the two lens receiving sections 11, for example, by soldering or brazing, and is shaped to conform to the contour of the lens receiving sections 11. As indicated in FIGS. 3 and 4, the bracket 12 is of generally trapezoidal shape. Also, as indicated in FIG. 5, two opposite edges of the bracket 12 are rounded inwardly to conform to the shape of the lens receiving sections 11.

The bracket 12 may be made of any suitable material for the purposes of mounting the nose piece assembly 13 and conforming to the material of the lens receiving sections 11.

Figure 5:
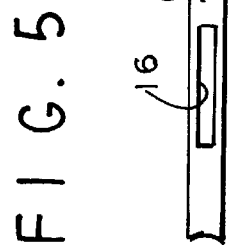
FIG. 5 illustrates a bottom view of the bracket of FIG. 4.

As shown in FIGS. 4 and 5, the bracket 12 is provided with a vertically disposed internal recess 16, for example, of rectangular shape and cross-section.

Referring to FIG. 3, each lens receiving section 11 is split at a point adjacent to the bracket 12 and an abutment 17 is secured thereto, for example by soldering. Each abutment 17 has a smooth counterbore (not shown) for receiving a clamping screw 18 which is sized to pass through the abutment 17 and thread into a threaded bore (not shown) in the bottom of the bracket 12 in order to secure the free end of the lens receiving section 11 to the bracket 12 to thereby hold a lens (not shown) within the lens receiving section 11.

Figure 2:
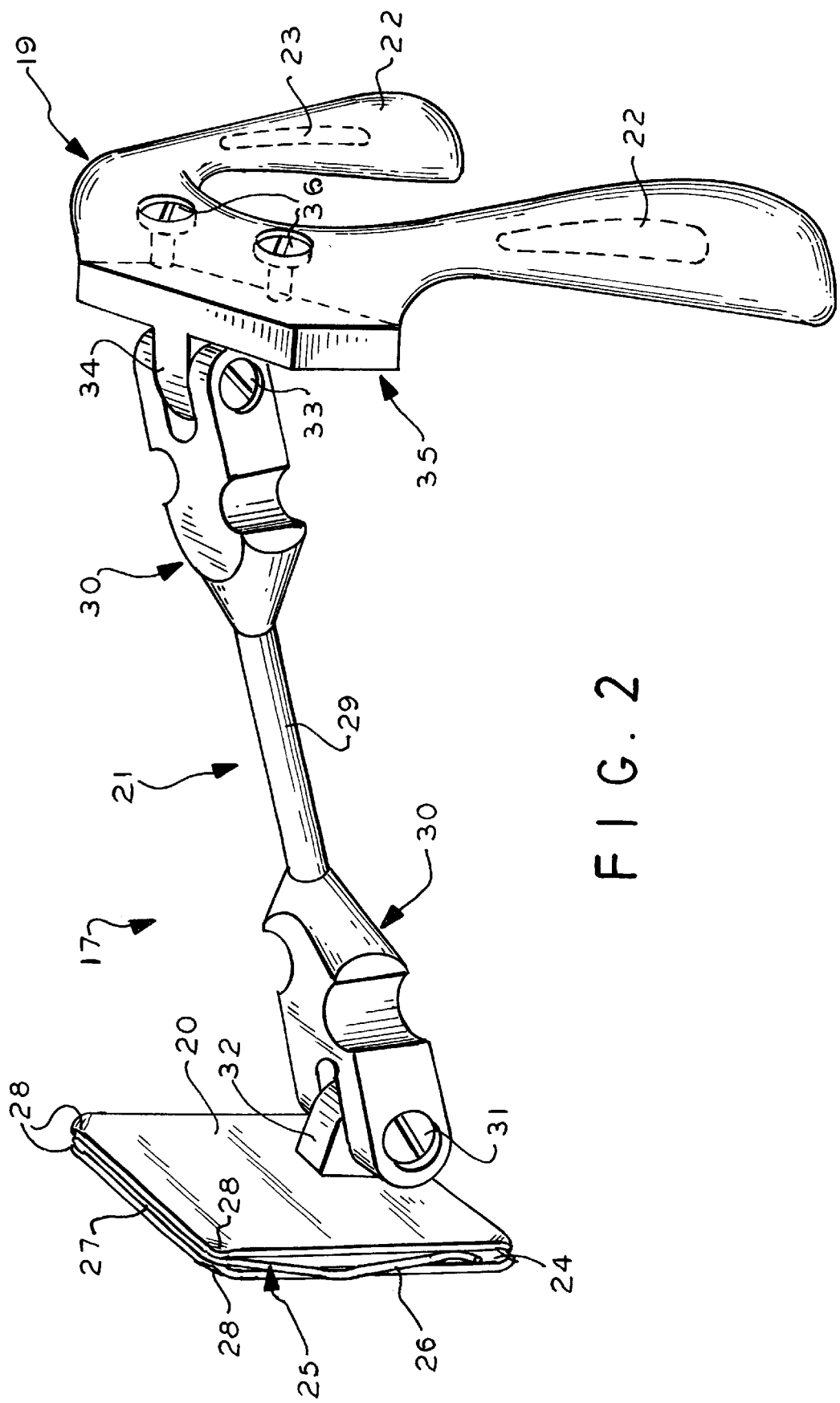
FIG. 2 illustrates a perspective view of a nose piece assembly constructed in accordance with the invention.

Referring to FIG. 2, the nose piece assembly 13 is made as a stand alone unit. As such, the nose piece assembly 13 may be removed from the bracket 12, for example, for replacement purposes. Further, the nose piece assembly 13 may be removed from the bracket 12 for purposes of storage, for example, to provide a flattened package for shipping purposes.

As illustrated, the nose piece assembly 13 includes a bridge 19 at one end for disposition on a nose of a user, a slide 20 at the opposite end for slidable mounting in the bracket 12 (see FIG. 1) and means 21 connected to and between the bridge 19 and slide 20 for adjusting the bridge 19 relative to the slide 20 and bracket 12.

Referring to FIGS. 2 and 3, the bridge 19 is of generally U-shape in order to rest on and about a user's nose. In addition, the bridge 19 has a pair of depending legs 22, each of which may receive a foamed pad 23 or other like cushioning element to rest on the user's nose.

The slide 20 is of generally rectangular shape and is sized to slide into the recess 16 (see FIG. 5) in the bracket 12. In addition, the slide 20 is provided with a peripheral groove 24 around each of at least three edges to receive a generally U-shaped spring 25. As illustrated, the spring 25 has a pair of legs 26 and a cross-bar 27 connecting the legs 26. Each leg 26 is also bowed outwardly. As shown in FIG. 2, the cross-bar 27 of the spring 25 fits within the groove 24 of the slide 20 while the two depending legs 26 (only one of which is shown) project outwardly of the groove 24 at the sides of the slide 20. As indicated, the top corners 28 of the slide 20 are crimped after placement of the spring 25 in order to secure the cross-bar 27 in place.

In use, the slide 20 is slid into the recess 16 of the bracket 12 while the bowed legs 26 of the spring 25 resiliently compress between the slide 20 and bracket 12 to releasably hold the slide 20 in the bracket 12.

Alternatively, any other type of spring may be used to secure the slide 20 within the recess 16 of the bracket 12. For example, a leaf spring arrangement may be used on only one side of the slide 20. Likewise, the slide 20 may be releasably held in or on the bracket 12 by other suitable means.

Referring to FIG. 2, the means 21 for adjusting the bridge 19 is pivotally connected to each of the bridge 19 and the slide 20. For example, this means 21 includes a rod 29 which carries a bifurcated element 30 at each end. One bifurcated element 30 is hinged via a screw 31 to an apertured ear 32 which is integral with or fixedly mounted on the slide 20. The other bifurcated element 30 is hinged via a screw 33 to an apertured ear 34 on a plate 35 secured to the bridge 19, for example, by a pair of screws 36 which pass either into the back of the bridge 19 as shown in FIG. 2 or into the front of the bridge 19 as shown if FIG. 3. Each bifurcated element 30 is sized to pass over the respective apertured ear 32,34 while the respective screws 31,33 thread into one of the bifurcations while freely passing through the other bifurcation of the respective element 30. As illustrated in FIG. 3, a pair of nylon washers 37 are disposed between each bifurcated elements 30 and the respective ears 32,34 to allow a friction fit in the hinged joints when the screws 31,33 are tightened in place.

The rod 29 may alternatively be slidably mounted in one or both of the bifurcated elements 30 and held in place by a set screw (not shown) in order to allow for a longitudinal adjustment of the rod 29 and, thus, of the bridge 19 relative to the slide 20.

Further, in still another embodiment, the means 21 connected to and between the bridge 19 and the slide 20 may be longitudinally adjustable without any pivoting motion. For example, the elements 30 on the ends of the rod 29 may be fixedly mounted on the bridge 19 and slide 20 and without being bifurcated.

Referring to FIG. 3, each lens receiving section 11 is provided with a pair of outwardly extending apertured ears 38 for mounting of the temples 14. In addition, each temple 14 has a pivot 39 fixedly secured thereto in suitable manner. As shown, each pivot 39 has a smooth aperture 40 to be aligned with the apertures in the ears 38 on a lens receiving section 11. In addition, a screw 41 or the like passes through the upper ear 38 and pivot aperture 40 into threaded engagement with a threaded bore in the lower ear 38 to hingedly secure the pivot 39 to the ears 38.

As shown in FIG. 1, each temple 14 has an upwardly bowed section 42 in order to allow access to the region of an eye of a user, for example for applying cosmetics. A rearwardly disposed section 43 is of conventional shape with a conventional sleeve 44 for fitting over a user's ear. Alternatively, the bowed section 42 may be downwardly bowed to allow access to the region of the eyes of the user.

The nose piece assembly 13 allows a wearer to adjust the eyeglass frame 10 to a comfortable position for applying make-up while enhancing the vision of the wearer. For example, the pivot connections in the nose piece assembly 13 are sufficiently rigid to retain a position into which the nose piece assembly 13 is adjusted without moving. On the other hand, the position of the bridge 19 may be adjusted manually by the wearer.

The pivoting nature of the nose piece assembly 13 allows the wearer to raise or lower the lens receiving sections 11 relative to the wearer's eyes and nose.

One of the advantages of the nose piece assembly 13 is that the nose piece assembly 13 may be replaced from time to time, for example, in the event of breakage of the nose piece assembly 13. Further, for purposes of storage, the nose piece assembly 13 may be readily pulled from the bracket 12 and laid flat, for example, within an eyeglass case. When the eyeglass frame 10 is to be re-used, the nose piece assembly 13 can be simply slipped back into place in the bracket 12.

For purposes of storage, the nose piece assembly 13 is removed from the bracket 12 and the temples 14 folded flat against the lens receiving sections 11. The bridge 19 and slide 20 are then pivoted into parallel positions relative to each other and over the rod 29.

The nose piece assembly 13 may be used with any type of eyeglass frame other than for applying cosmetics where there is a need for adjusting the lenses in the frame relative to the wearer's eyes. Also, a wearer may be able to remove and replace the nose piece assembly 13 with a smaller more conventional nose piece assembly for use in situations where cosmetics are not to be applied and where appropriate to the lenses of the eyeglasses. In such cases, the temples 14 may also be replaced by more conventional temples.

The invention thus provides a pair of make-up eyeglasses which may be readily adjusted while in place or when put into use by the user.

Further, the invention provides a pair of make-up eyeglasses with a nose piece assembly which may be readily removed and re-mounted in place or replaced by another nose piece assembly.

Still further, the invention provides an adjustable pair of makeup eyeglasses which may be readily transported in a flattened condition.

What is claimed is:

1. An eyeglass frame comprising
a pair of lens receiving sections;
a bracket secured between said lens receiving sections; and
a nose piece assembly including a slide slidably mounted on said bracket for movement longitudinally thereof, a bridge for disposition on a nose of a user and means connected to and between said slide and said bridge for adjusting said bridge relative to said slide.

2. An eyeglass frame as set forth in claim 1 wherein said bracket includes a vertically disposed recess and said slide is slidably mounted in said recess.

3. An eyeglass frame as set forth in claim 2 which further comprises a spring disposed between said slide and said bracket and within said recess for releaseably engaging said slide and abutting said bracket to hold said slide in said recess.

4. An eyeglass frame as set forth in claim 3 wherein said spring is generally U-shaped.

5. An eyeglass frame as set forth in claim 1 wherein said means is pivotally connected to said slide to pivot said bridge vertically of said bracket.

6. An eyeglass frame as set forth in claim 5 wherein said means is pivotally connected to said bridge.

7. An eyeglass frame as set forth in claim 1 wherein said means includes a rod pivotally connected at one end to said slide and pivotally connected at an opposite end to said bridge.

8. An eyeglass frame as set forth in claim 1 wherein said means is longitudinally adjustable to allow adjustment of said nose piece assembly to the size of the wearer's nose and face.

9. An eyeglass frame as set forth in claim 1 which further comprises a pair of temples, each said temple being pivotally mounted on a respective lens receiving section.

10. An eyeglass frame as set forth in claim 9 which further comprises a pair of ears on a respective lens receiving section, a pivot fixedly secured to a respective temple and disposed between said ears, and means hingedly securing said pivot to said ears.

11. A nose piece assembly for an eyeglass frame comprising a slide for slidably mounting on an eyeglass frame;

a bridge for disposition on the nose of a user; and means connected to and between said slide and said bridge for adjusting said bridge relative to said slide.

12. A nose piece assembly as set forth in claim 11 wherein said means is pivotally connected to said slide to pivot said bridge vertically of said slide.

13. A nose piece assembly as set forth in claim 11 wherein said means is pivotally connected to said bridge.

14. A nose piece assembly as set forth in claim 11 wherein said means includes a rod pivotally connected at one end to said slide and pivotally connected at an opposite end to said bridge.

15. A nose piece assembly as set forth in claim 11 wherein said means is longitudinally adjustable to allow adjustment of said nose piece assembly to the size of the wearer's nose and face.

16. An eyeglass frame for use in applying eye makeup, said frame comprising a pair of lens receiving sections;

a bracket secured to and between said lens receiving sections; and a nose piece assembly removably mounted on said bracket for spacing said lens receiving sections from a user's face.

17. An eyeglass frame as set forth in claim 16 wherein said nose piece assembly includes a bridge at one end for disposition on a nose of a user and means connected to and between said bridge and said bracket for adjusting said lens receiving sections relative to the nose of the user.

18. An eyeglass frame as set forth in claim 17 wherein said means is pivotally connected relative to said bridge and pivotally connected relative to said bracket.

19. An eyeglass frame as set forth in claim 18 wherein said means is longitudinally adjustable.

20. In combination an eyeglass frame having a centrally disposed bracket including a recess therein; and a nose piece assembly including a slide slidably mounted in said recess of said bracket for movement longitudinally thereof, a bridge for disposition on a nose of a user and means connected to and between said slide and said bridge for adjusting said bridge relative to said slide.

21. The combination as set forth in claim 20 which further comprises a U-shaped spring disposed on said slider and slidably received in said recess for releaseably engaging said bracket to hold said slide in said bracket.

22. The combination as set forth in claim 20 wherein said means is pivotally connected to each of said slide and said bridge.

23. The combination as set forth in claim 20, wherein said means is longitudinally adjustable to allow adjustment of said nose piece assembly to the size of a wearer's nose.

* * * * *